United States Patent Office 3,040,817
Patented June 26, 1962

3,040,817
VARIABLE PITCH PROPELLERS
Robert Terence Elmes and John Alfred Chilman, Gloucester, England, assignors to Rotol Limited, Gloucester, England, a British company
Filed Mar. 31, 1958, Ser. No. 725,325
Claims priority, application Great Britain Apr. 15, 1957
4 Claims. (Cl. 170—160.58)

This invention relates to variable pitch propellers, and concerns bearing arrangements for the blades of such propellers enabling the pitch setting of the blades to be adjusted.

The present invention contemplates the provision of a variable pitch propeller comprising a propeller hub, a plurality of hub bosses on said propeller hub, a plurality of variable pitch propeller blades each having a tip end and root end, said blades being mounted one in each of said hub bosses for rotation about its pitch change axis and with its tip end remote from said hub, a bearing arrangement for each blade comprising a ball thrust bearing and a cylindrical-roller thrust bearing, both of said bearings being centered on the pitch change axis of the blade, said bearings being spaced apart in the direction of the pitch change axis with the ball thrust bearing nearer the tip end of the blade, said bearings comprising between them three race rings of which the central race ring is received directly within the hub boss of said blade and is attached to the hub, said propeller further comprising a shoulder formed on each said blade near its root end and a member screwed into the root end of each blade root, said shoulder and said member containing between them said bearing arrangement and said member being screwed into said blade root sufficiently to pre-load said bearings.

Figure 1:
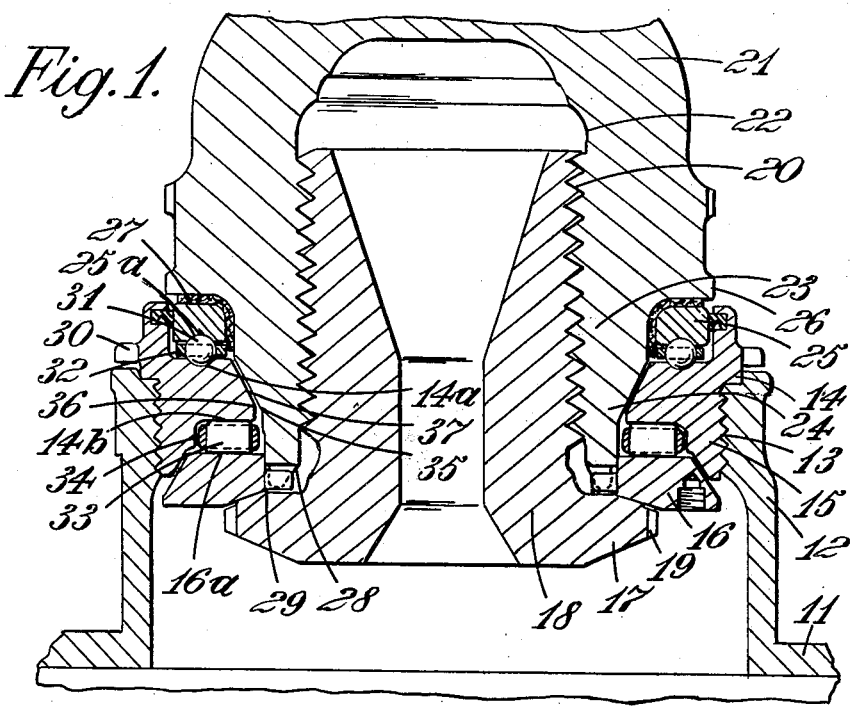
Figure 2:
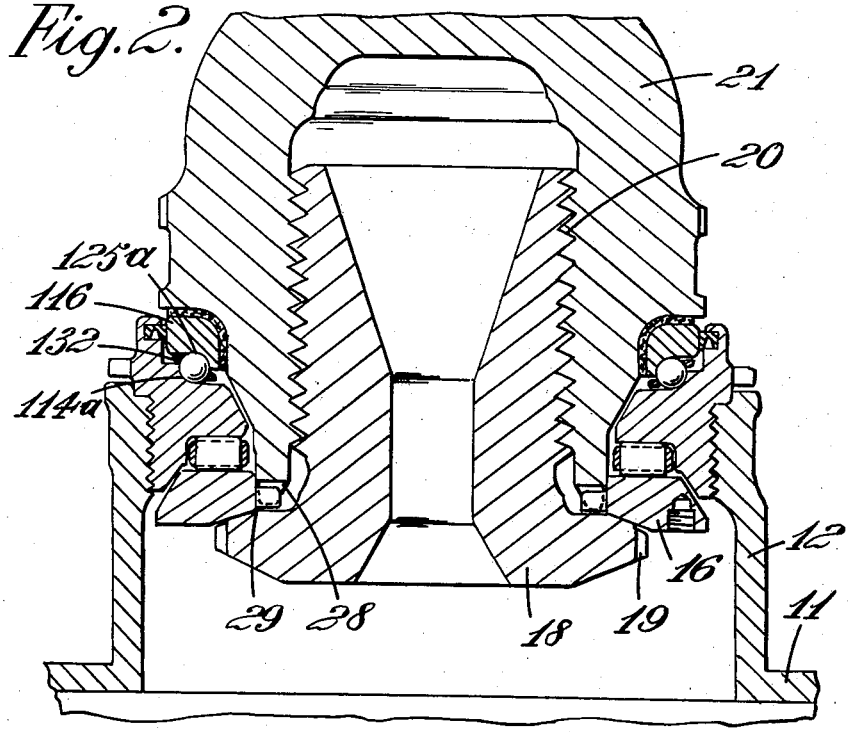
Figure 3:
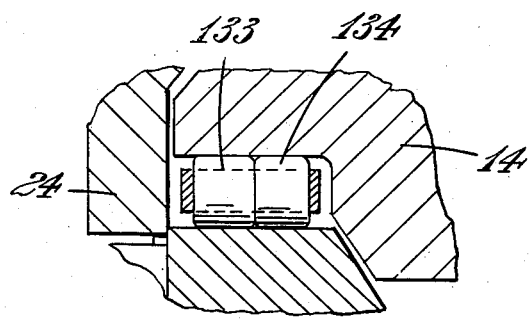
Figure 4:
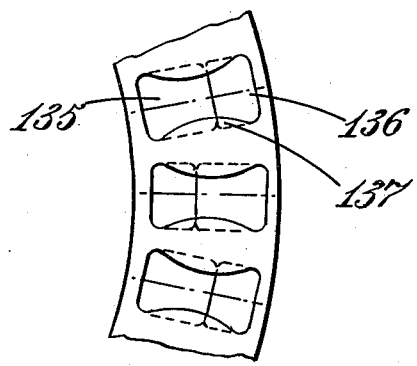

Several embodiments of the present invention will now be described, merely by way of example, and with reference to the accompanying drawings in which:

FIGURE 1 is a cross-section showing a bearing arrangement according to the present invention, FIGURE 2 is a cross-section of a modified construction and, FIGURE 3 is a scrap cross-sectional view showing a modification which may be made to the roller bearing of the bearing arrangement shown in FIGURES 1 and 2, and FIGURE 4 is a scrap plan view showing a further modification which may be made to the roller bearing of the bearing arrangements shown in FIGURES 1 and 2.

Referring to FIGURE 1, the propeller hub 11 is provided with a hollow hub boss 12 for each blade. The outer end of the boss is internally threaded as at 13 to receive a central race ring 14 of a ball thrust bearing and a cylindrical roller thrust bearing assembly 15 comprising an inner race ring 16, the central race 14 and an outer race ring 25, the roller bearing and the ball bearing being each centered on the pitch change axis of the blade, and spaced apart in the direction of the pitch change axis with the ball bearing nearer the tip of the blade.

The inner race ring 16 is engaged by a flange 17 formed on a member 18 which is screwed into the blade from its root end, the member passing through the bearing assembly 15 i.e. the flange 17 engages the inner face of the inner race ring 16, and the member 18 extends radially outwardly of the hub. The peripheral edge of the flange 17 is toothed as at 19 and is engaged by a suitable locking plate (not shown), which may be conveniently bolted to the inner face of the inner race ring 16.

The root 23 of the blade is formed with an inward circumferential step 24, and the race rings 16, 14 and 25 are clamped together between a shoulder 26 on the blade, formed by the step 24, and the flange 17, a washer 27 of suitable shape being interposed between the race ring 25 and the shoulder 26 and the reduced diameter lengthwise extending part of the blade formed by the step being received within the races.

The end face of the root end of the blade is toothed as at 28 and engages with a correspondingly formed inwardly-extending rim 29 of the race 16. This prevents relative rotation between the blade 21 and the race ring 16 about the pitch change axis of the blade.

To ensure that the bearing-blade assembly does not inadvertently become loose with respect to the boss 12, the peripheral edge of the race ring 14 is formed with teeth 30 which are engageable by a correspondingly toothed locking plate (not shown) which is bolted in convenient manner to the hub 11.

A single ring of balls 31, retained in a cage 32, is accommodated between suitably formed track grooves 25a and 14a in the race ring 25 and the outer face of the central race ring 14 respectively.

A single ring of cylindrical rollers 33, retained in a cage 34, is interposed between tracks 14b and 16a on the inner face of the central race ring 14 and the outer face of the inner race ring 16 respectively.

With this bearing arrangement a desired pre-load is provided by tightening up the member 18 into the internally screw-threaded blade root so that under all operating conditions the balls and rollers maintain contact with their tracks. With the arrangement described, it will be seen that the centrifugal loading on the blade during operation is taken by the roller bearing while the thrust load is taken by the ball bearing.

A frusto conical part 35 of the step 24 which converges towards the root end of the blade is received within a corresponding frusto-conical seating 36 formed on the inner diameter of the central race ring 14, the frusto-conical part 35 and the frusto-conical seating 36 each having its axis of generation co-incident with the pitch change axis of the blade.

A small clearance 37 is maintained between the part 35 and the seating 36, the part 35 and the seating 36 being held spaced by the ball bearing. Thus in the event of failure of the ball bearing during operation, the part 35 may seat down onto the seating 36 to support the blade and prevent excessive lateral movement of the blade with respect to the hub boss. Under such conditions of failure, normal pitch changing movements of the blade cannot be made satisfactorily, but it is possible to feather the propeller with one of the blades bearing upon its seating 36. A similar clearance is shown between frusto-conical surfaces on rings 14 and 16 against failure of the roller bearing.

FIGURE 2 shows a modified bearing arrangement which corresponds closely with FIGURE 1, except that the ball thrust bearing is replaced by a single row angular contact ball bearing to take account of excessive bending forces in the blade. The grooved tracks 125a and 114a of the angular contact bearing closely conform to the shape of the balls and extend only through an angle of approximately 90 degrees as shown. The ball bearing cage 132 in this arrangement is frusto-conical in shape, as shown.

The modified bearing tracks 125a and 114a provide a greater journal capacity for the ball bearing, and in this way the side loads at the root, consequent upon excessive bending of the blade under high transverse aerodynamic loading, are better accommodated.

With the bearing arrangements described it will be seen that the hub boss 12 has a diameter which is little greater than that of the blade root. This is achieved in part by mounting the central race ring 14 directly in the hub boss, and in part by accommodating the bearing arrangement substantially within the diameter of the blade root by undercutting the root.

By keeping the hub bosses 12 small in diameter it is possible to arrive at a smaller overall diameter for the propeller hub, which means that the diameter of the spinner can be relatively small. This is of importance where the propeller is for a gas turbine propeller engine since the spinner diameter is determined by the required inner diameter of the annular air intake of the engine.

By employing a cylindrical-roller thrust bearing arranged as described, maximum centrifugal load carrying capacity is ensured in the planes of the longitudinal axis of the blade.

The ball thrust bearing in the construction of FIGURE 1 has deeply grooved ball tracks as shown to provide adequate journal capacity for the bearing assembly, the ball bearing being such as to afford pre-loading of the bearing assembly sufficient to take account of the fluctuating blade stresses.

As may be seen from the drawings the flange 17 of the member 18 has an angular seating contact with the race ring 16 such that the pre-loading reaction is taken through the centres of the rollers of the roller bearing and the centres of the balls of the ball bearing. This allows of the races being of the largest possible cross-section within the space available so that the toroidal deflection of the races under high centrifugal load is reduced.

In the construction of FIGURE 2 the cage 132 of the angular contact ball bearing may be omitted if desired so that more balls may be accommodated to increase the load capacity of the ball bearing.

With regard to the roller bearing in the constructions of both FIGURES 1 and 2 one end face or the other, or both, of each roller may be radiused or domed in order to minimise friction between the roller and the adjacent end wall of its pocket.

FIGURE 3 shows a further modification of the roller bearing which may be incorporated in the arrangement of FIGURE 1 or FIGURE 2.

This modification comprises the substitution of a pair of equally sized rollers 133 and 134 in place of each single roller of FIGURE 1 and FIGURE 2. By incorporating this modification, improved rolling characteristics are achieved. Each of the end faces of each pair of rollers may be flat, or alternatively any one or more end faces in each pair may be radiused or domed to minimise friction as desired.

FIGURE 4 shows a further modification which ensures more even distribution of thrust between the races of the roller bearing. In this modification, one long roller 135 and one short roller 136 are retained in each cage pocket 137, the long and short rollers being interchanged as to position in adjacent pockets as shown.

As with the roller arrangement of FIGURE 3, each of the end faces of each pair of rollers may be flat, or alternatively any one or more end faces in each pair may be radiused or domed to minimise friction as desired.

We claim:
1. A variable pitch propeller comprising a propeller hub; a plurality of hub bosses on said propeller hub; a plurality of variable pitch propeller blades each having a tip end and root end, and having an inward circumferential step near its root end and having a portion of reduced diameter terminating at said root end, said blades being mounted one in each of said hub bosses for rotation about its pitch change axis and with its tip end remote from said hub; a member screwed into said root end of each blade; and a bearing arrangement for each blade comprising a ball thrust bearing and a cylindrical-roller thrust bearing, both of said bearings being centered on the pitch change axis of the blade, said bearings being spaced apart in the direction of the pitch change axis with the ball thrust bearing nearer the tip end of the blade, said bearings comprising between them three race rings of which the central race ring is received directly within the hub boss of said blade and is attached to the hub; and of which the race ring nearest the root end of the propeller blade (hereinafter termed the inner race ring) receives within it and engages the reduced diameter portion of said blade to prevent relative rotation between said inner race ring and said blade, said races being positioned between and preloaded by said step and said member, the central race ring having oppositely-facing frusto-conical seatings formed thereon centered on the pitch change axis of the blade, and the inner race ring and the reduced diameter portion of the blade having oppositely-facing frusto-conical bearing surfaces which are disposed close to but spaced from the respective said seatings.

2. A variable pitch propeller comprising a propeller hub; a plurality of hub bosses on said propeller hub; a plurality of variable pitch propeller blades each having a tip end and root end, and having an inward circumferential step near its root end, a frusto-conical part between said step and said root end converging towards said root end, and a portion of reduced diameter terminating at said root end, said blades being mounted one in each of said hub bosses for rotation about its pitch change axis and with its tip end remote from said hub, a member screwed into said root end of each blade; and a bearing arrangement for each blade comprising a ball thrust bearing and a cylindrical-roller thrust bearing, both of said bearings being centered on the pitch change axis of the blade, said bearings being spaced apart in the direction of the pitch change axis with the ball thrust bearing nearer the tip end of the blade, said bearings comprising between them three race rings of which the central race ring is received directly within the hub boss of said blade and is attached to the hub; said central race ring having a frusto-conical seating, the frusto-conical part of said blade and said frusto-conical seating each having its axis of generation coincident with the pitch change axis of the blade, and said frusto-conical part of said blade being received within but spaced by a small extent from said frusto-conical seating; said propeller further comprising a shoulder formed on each said blade near its root end and a member screwed into the root end of each blade root, said shoulder and said member containing between them said bearing arrangement and said member being screwed into said blade root sufficiently to preload said bearings.

3. A variable pitch propeller comprising a propeller hub; a plurality of hub bosses on said propeller hub; a plurality of variable pitch propeller blades each having a tip end and root end, said blades being mounted one in each of said hub bosses for rotation about its pitch change axis and with its tip end remote from said hub; a bearing arrangement for each blade comprising a ball thrust bearing and a cylindrical-roller thrust bearing, both of said bearings being centered on the pitch change axis of the blade, said bearings being spaced apart in the direction of the pitch change axis with the ball thrust bearing nearer the tip end of the blade, the roller thrust bearing being of smaller diameter than the ball thrust bearing, said bearings comprising between them three race rings of which the central race ring is received directly within the hub boss of said blade and is attached to the hub, said propeller further comprising a shoulder formed on each said blade near its root end and a member screwed into the root end of each blade root, said shoulder and said member containing between them said bearing arrangement and said member being screwed into said blade root sufficiently to preload said bearings, and said member having a seating contact with the race ring nearest the blade root end which seating contact is inclined with respect to planes normal to the pitch change axis of the blade whereby the pre-loading reaction is taken through the rollers of the roller bearing.

4. A variable pitch propeller comprising a propeller hub; a plurality of hub bosses on said propeller hub; a plurality of variable pitch propeller blades each having a tip end and root end, said blades being mounted one in each of said hub bosses for rotation about its pitch change axis and with its tip end remote from said hub; a bearing arrangement for each blade comprising a ball thrust bearing and a cylindrical-roller thrust bearing, both of said bearings being centered on the pitch change axis of the blade, said bearings being spaced apart in the direction of the pitch change axis with the ball thrust bearing nearer the tip end of the blade, the roller thrust bearing being of smaller diameter than the ball thrust bearing, said bearings comprising between them three race rings of which the central race ring is received directly within the hub boss of said blade and is attached to the hub, said propeller further comprising a shoulder formed on each said blade near its root end and a member screwed into the root end of each blade root, said shoulder and said member containing between them said bearing arrangement and said member being screwed into said blade root sufficiently to preload said bearings, and said member having a seating contact with the race ring nearest the blade root end which seating contact is inclined with respect to planes normal to the pitch change axis of the blade, the preloading reaction being taken through the centers of the rollers of the roller bearing and the centers of the balls of the ball bearing.

References Cited in the file of this patent

UNITED STATES PATENTS

| | | |
|---|---|---|
| 1,910,246 | Heisler | May 23, 1933 |
| 2,248,590 | Smith | July 8, 1941 |
| 2,438,542 | Cushman | Mar. 30, 1948 |
| 2,514,477 | Cushman | July 11, 1950 |

FOREIGN PATENTS

| | | |
|---|---|---|
| 562,863 | Great Britain | July 19, 1944 |
| 564,928 | Great Britain | Oct. 19, 1944 |
| 637,238 | Great Britain | May 17, 1950 |